(12) United States Patent
Long

(10) Patent No.: US 7,929,319 B2
(45) Date of Patent: Apr. 19, 2011

(54) POSITIONING STRUCTURE FOR PORTABLE ELECTRONIC DEVICE

(75) Inventor: Jiang Long, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 0 days.

(21) Appl. No.: 12/610,507

(22) Filed: Nov. 2, 2009

(65) Prior Publication Data

US 2010/0328907 A1     Dec. 30, 2010

(51) Int. Cl.
*H05K 7/14* (2006.01)
*H05K 7/18* (2006.01)

(52) U.S. Cl. .......................... 361/802; 361/807; 361/810

(58) Field of Classification Search .......... 361/800–803, 361/807, 810, 752, 730, 790, 797; 439/374, 439/377; 174/138 E
See application file for complete search history.

(56) References Cited

U.S. PATENT DOCUMENTS

| | | | | |
|---|---|---|---|---|
| 6,741,477 | B2 * | 5/2004 | Sivertsen | 361/752 |
| 7,416,441 | B2 * | 8/2008 | Nishiyama | 439/529 |
| 7,486,523 | B2 * | 2/2009 | Wu et al. | 361/747 |

* cited by examiner

*Primary Examiner* — Hung S Bui
(74) *Attorney, Agent, or Firm* — Steven M. Reiss

(57) ABSTRACT

A positioning structure for portable electronic device includes two latching elements and a positioning element. Each latching element includes a blocking portion. The positioning element includes a cover portion and two fixing portions formed at two ends thereof. The cover portion defines a plurality of cavities for receiving electronic components. Each fixing portion defines a hole, and the blocking portion is received in the hole.

13 Claims, 4 Drawing Sheets

POSITIONING STRUCTURE FOR PORTABLE ELECTRONIC DEVICE

BACKGROUND

1. Technical Field

The present disclosure relates to positioning structures, and particularly to a positioning structure for portable electronic devices.

2. Description of Related Art

Portable electronic devices generally need to combine a plurality of components or parts such as a camera module, an earphone and so on. A typical camera module or earphone is fixed to a cover. The cover is further fixed to the main housing of the portable electronic device with screws. During assembly, the screws need to be rotated to tightly assemble the cover to the main housing. The rotating process might shift the camera module or earphone out of position, accordingly degrading the product quality.

Therefore, there is room for improvement within the art.

BRIEF DESCRIPTION OF THE DRAWING

Many aspects of the positioning structure can be better understood with reference to the following drawings. The components in the drawings are not necessarily drawn to scale, the emphasis instead being placed upon clearly illustrating the principles of the positioning structure. Moreover, in the drawings, like reference numerals designate corresponding parts throughout the several views.

DETAILED DESCRIPTION

Figure 1:
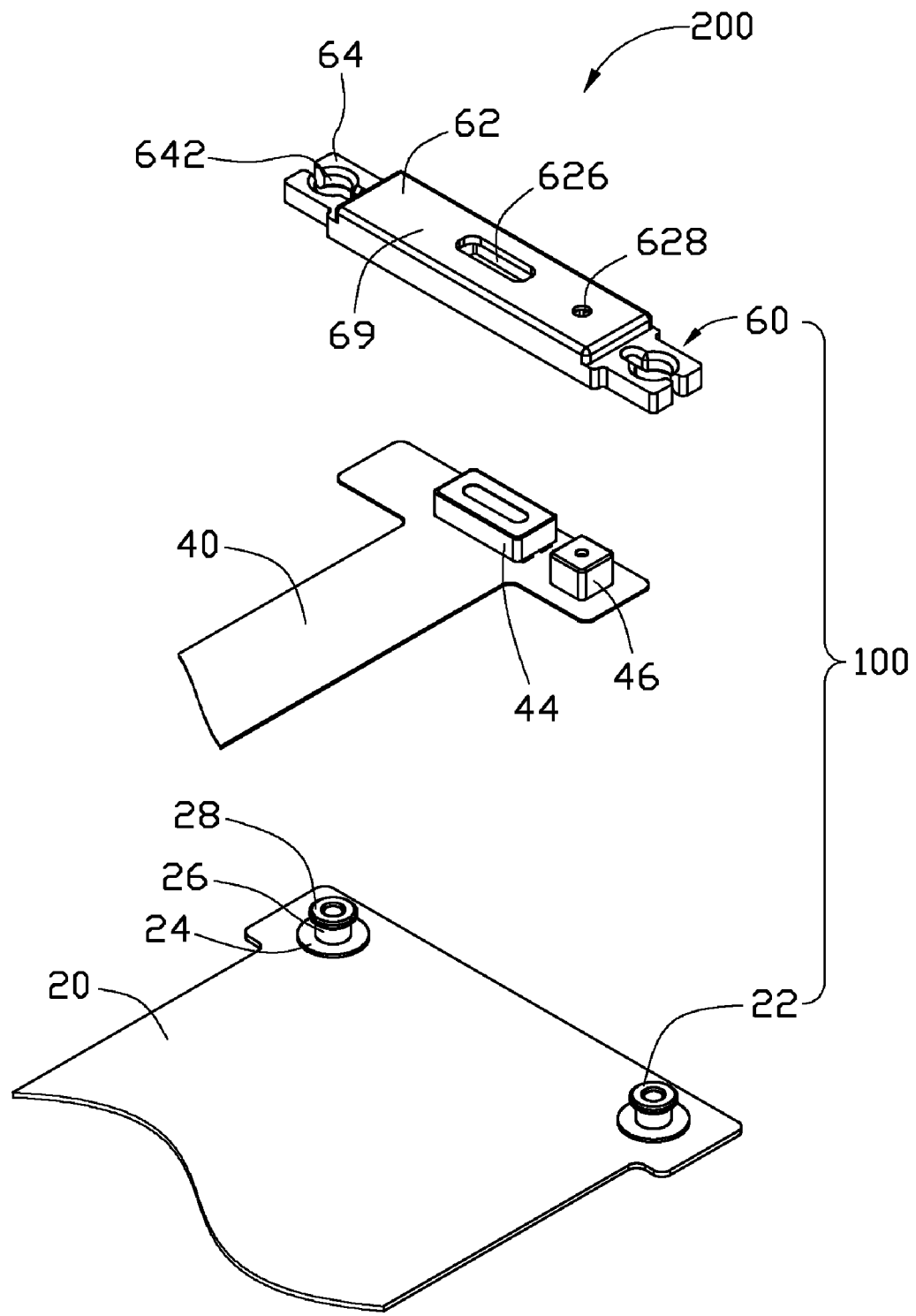
FIG. 1 is an exploded view of a positioning structure for a portable electronic device according to an exemplary embodiment.
Figure 2:
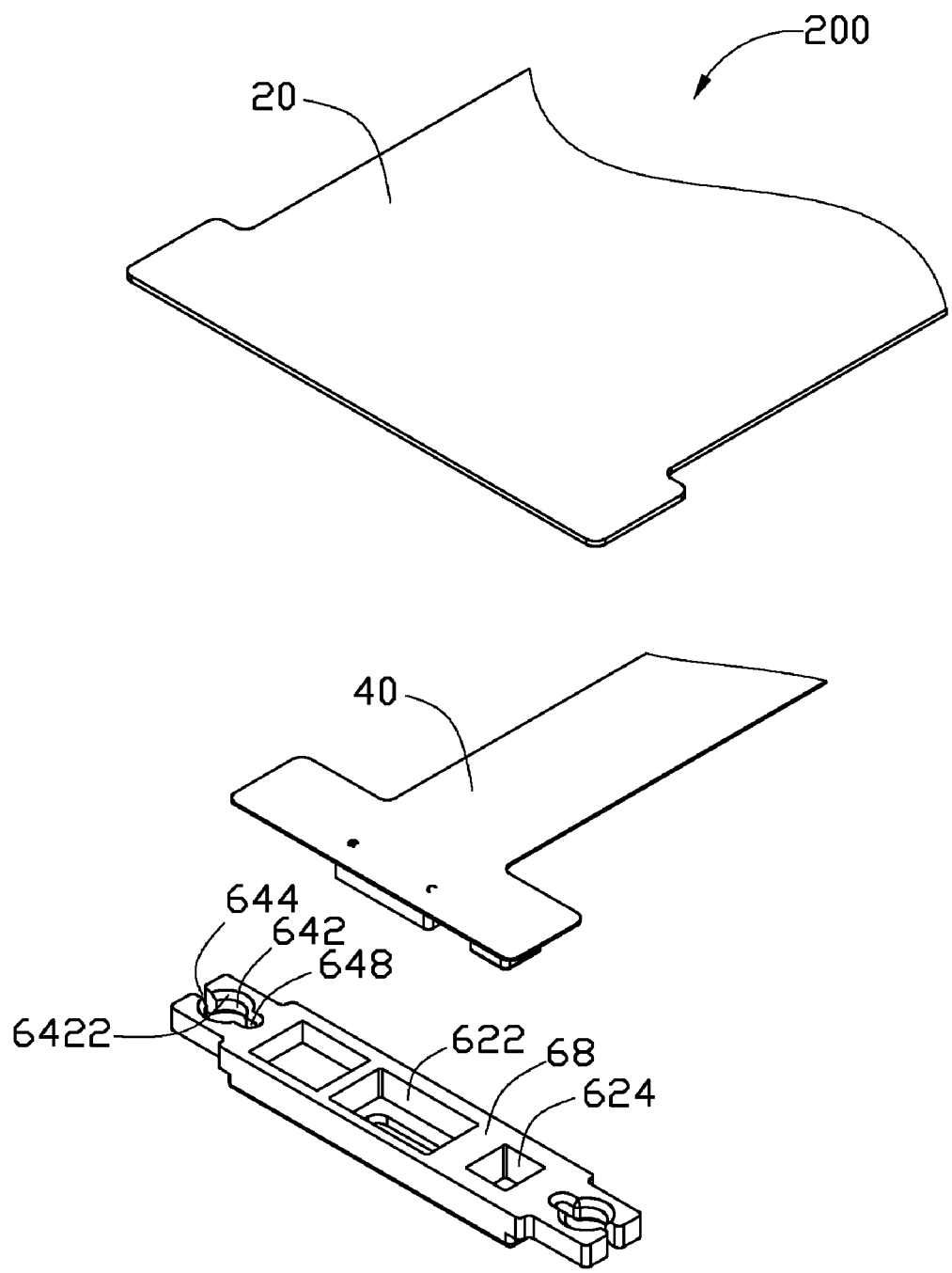
FIG. 2 is similar to FIG. 1, showing another aspect.

FIGS. 1 and 2 show a positioning structure 100 attached to a portable electronic device 200. The portable electronic device 200 includes a housing 20 and a printed circuit board 40. The housing 20 can be a slidable metal plate of a sliding-type mobile phone. The printed circuit board 40 is a flexible printed circuit board. A camera 44 and an earphone 46 are electrically connected to the printed circuit board 40.

Figure 3:
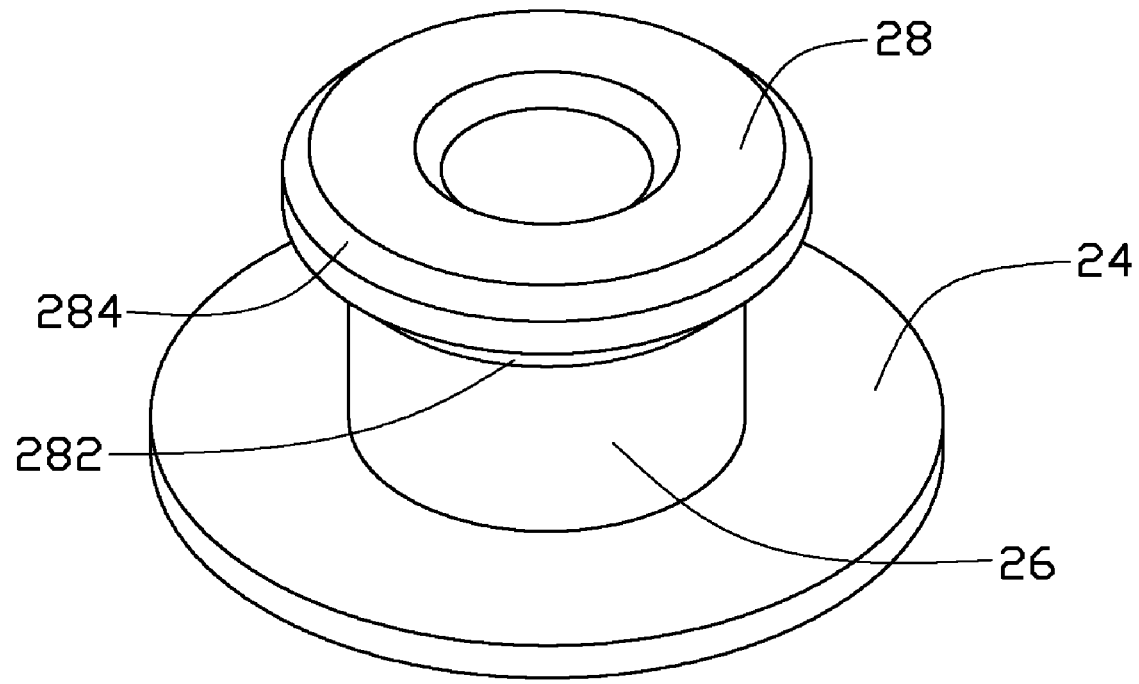
FIG. 3 is an enlarged view of a latching element of FIG. 1.

The positioning structure 100 is used for mounting the camera 44 and the earphone 46 to the housing 20. The positioning structure 100 includes two latching elements 22 and a positioning element 60. Referring to FIG. 3, each latching element 22 may be made of a rigid material, such as metal, and includes a mounting portion 24, a neck portion 26 and a blocking portion 28. The mounting portion 24 is a thin plate, and is formed on one end of the neck portion 26. The mounting portion 24 is welded to the housing 20. The blocking portion 28 is formed at the other end of the neck portion 26 opposite to the mounting portion 24. The blocking portion 28 is made of two overlapping truncated cones, and includes a first guiding surface 282 and a second guiding surface 284.

The positioning element 60 is made of elastic material such as plastic or rubber. The positioning element 60 includes a cover portion 62 and two fixing portion 64. The cover portion 62 includes a top surface 68 and a bottom surface 69. The top surface 68 defines an opening 626 for exposing the earphone 44 and an aperture 628 for exposing the camera 46. The bottom surface 69 defines a first receiving cavity 622 for receiving the earphone 44 and a second receiving cavity 624 for receiving the camera 46. Each fixing portion 64 is formed at one side of the cover portion 62. Each fixing portion 64 defines a hole 642, a slot 644 and a notch 648. The slot 644 communicates with a free end of the fixing portion 64 to allow the hole 642 to increase in diameter. The combined shape of the hole 642 and the notch 648 is generally pear-shaped. Two sides of the hole 642 respectively provide an engaging guiding surface 6422.

Figure 4:
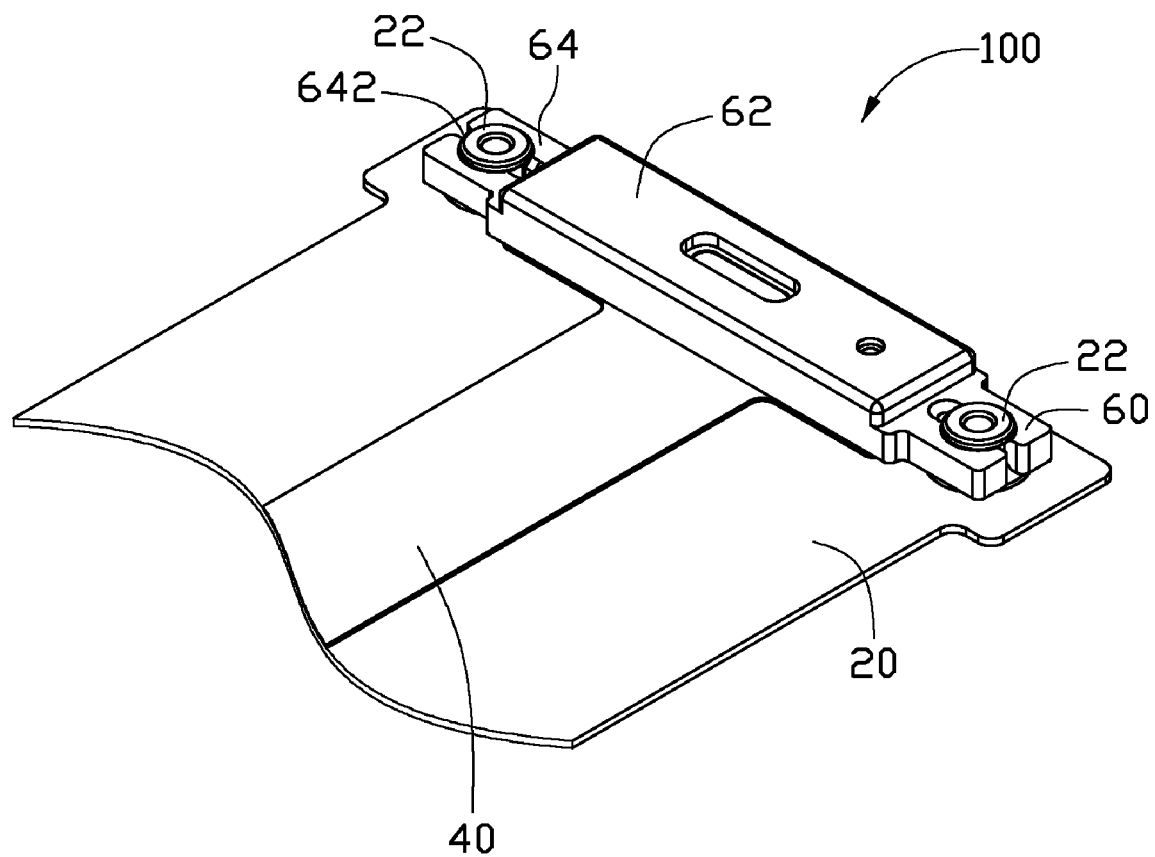
FIG. 4 is an assembled isometric view of the positioning structure shown in FIG. 1.

FIG. 4 shows an assembled portable electronic device 200. When assembled, the two latching elements 22 are respectively welded to the housing 20. The printed circuit board 40 is positioned on the housing 20, and the earphone 44 and the camera 46 are positioned between the two latching elements 22. Then, the positioning element 60 is positioned on the printed circuit board 40, with the earphone 44 contained in the first receiving cavity 622 and the camera 46 contained in second receiving cavity 624. One of the fixing portions 64 is pressed down to force resilient enlargement of the hole 642. The second guiding surface 284 of the corresponding latching element 22 slides along the engaging guiding surface 6422 of the hole 642 until the blocking portion 28 completely passes through the hole 642. The hole 642 resumes its original shape to lock the blocking portion 28. The first guiding surface 282 engages with the other engaging guiding surface 6422. The assembling process of the other latching element 22 is similar to the above latching element 22, and thus is not detailed. The latching elements 22 and the positioning element 60 may help the earphone 44 and the camera module 46 be accurately fixed to the portable electronic device 200. The assembly process is easy and convenient.

It is to be understood, however, that even through numerous characteristics and advantages of exemplary embodiments have been set forth in the foregoing description, together with details of the structure and function of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A positioning structure for a portable electronic device, comprising:
   two latching elements;
   a positioning element including a cover portion and two fixing portions formed at two ends thereof, the cover portion defining a plurality of cavities for receiving electronic components, each fixing portion defines a hole, one latching element being locked in each hole, each fixing portion further defining a slot communicating with the hole, the slot communicating with a free end of the fixing portion to allow the diameter of the hole to be enlarged.

2. The positioning structure as claimed in claim 1, wherein each fixing portion further defines a notch, the hole communicates with the slot and the notch.

3. The positioning structure as claimed in claim 1, wherein two sides of each hole respectively provide an engaging guiding surface, each latching element including a blocking portion forming a first guiding surface and a second guiding surface for engaging with the engaging guiding surfaces.

4. The positioning structure as claimed in claim 1, wherein each latching element includes a blocking portion, a mounting portion, and a neck portion, the neck portion is connected with the mounting portion and the blocking portion.

5. The positioning structure as claimed in claim 4, wherein each latching element is made of metal, and the positioning element is made of elastic material.

6. A portable electronic device, comprising:
a housing;
a printed circuit board configured for providing a plurality of components;
a positioning structure comprising two latching elements and a positioning element, the positioning element including a cover portion and two fixing portions formed at two sides thereof, the cover portion defining a plurality of cavities for receiving electronic components, each fixing portion defines a hole, two ends of the hole respectively providing an engaging guiding surface, each latching element including a blocking portion made of two overlapping truncated cones, one latching element being locked in each hole, the truncated cones engaging with the first guiding surface and the second guiding surface.

7. The portable electronic device as claimed in claim 6, wherein the two latching elements are respectively welding to the housing.

8. The portable electronic device as claimed in claim 6, wherein each fixing portion further defines a slot communicating with the hole, the slot communicates with a free end of the fixing portion to allow the diameter of the hole to increase.

9. The portable electronic device as claimed in claim 8, wherein each fixing portion further defines a notch, the hole communicates with the slot and the notch.

10. The portable electronic device as claimed in claim 6, wherein the blocking portion defines a first guiding surface and a second guiding surface at two ends thereof for engaging with the engaging guiding surfaces.

11. The portable electronic device as claimed in claim 6, wherein each latching element includes a blocking portion, a mounting portion, and a neck portion, the neck portion is connected with the mounting portion and the blocking portion.

12. A positioning structure for a portable electronic device, comprising:
two latching elements, each latching element including a blocking portion, a mounting portion, and a neck portion, the neck portion being connected with the mounting portion and the blocking portion;
a positioning element including a cover portion and two fixing portions formed at two ends thereof, the cover portion defining a plurality of cavities for receiving electronic components, each fixing portion defines a hole, one latching element being locked in each hole.

13. The positioning structure as claimed in claim 12, wherein each latching element is made of metal, and the positioning element is made of elastic material.

* * * * *